(12) United States Patent
Sheng et al.

(10) Patent No.: US 12,302,385 B2
(45) Date of Patent: May 13, 2025

(54) DEVICE AND METHOD FOR WIRELESS CHANNEL ACCESS

(71) Applicant: JRD COMMUNICATION (SHENZHEN) LTD., Guangdong (CN)

(72) Inventors: Jia Sheng, Guangdong (CN); Tian Li, Guangdong (CN)

(73) Assignee: J RD COMMUNICATION (SHENZHEN) LTD., Guangdong (CN)

( * ) Notice: Subject to any disclaimer, the term of this patent is extended or adjusted under 35 U.S.C. 154(b) by 368 days.

(21) Appl. No.: 17/760,299

(22) PCT Filed: Feb. 10, 2020

(86) PCT No.: PCT/CN2020/074644
§ 371 (c)(1),
(2) Date: Aug. 5, 2022

(87) PCT Pub. No.: WO2021/159241
PCT Pub. Date: Aug. 19, 2021

(65) Prior Publication Data
US 2023/0076058 A1    Mar. 9, 2023

(51) Int. Cl.
*H04W 4/00* (2018.01)
*H04W 16/14* (2009.01)
*H04W 74/0808* (2024.01)

(52) U.S. Cl.
CPC ....... *H04W 74/0808* (2013.01); *H04W 16/14* (2013.01)

(58) Field of Classification Search
CPC ........................ H04W 74/0808; H04W 16/14
USPC ....................................................... 370/328
See application file for complete search history.

(56) References Cited

U.S. PATENT DOCUMENTS

| 11,843,551 | B2* | 12/2023 | Salim ................ H04W 72/0446 |
| 2019/0037582 | A1* | 1/2019 | Noh ...................... H04L 5/0094 |
| 2019/0313454 | A1 | 10/2019 | Pu et al. | |
| 2021/0185719 | A1* | 6/2021 | Xue ...................... H04L 5/0092 |

(Continued)

FOREIGN PATENT DOCUMENTS

| CN | 105611641 A | 5/2016 |
| CN | 107733616 A | 2/2018 |

(Continued)

OTHER PUBLICATIONS

International Search Report in International application No. PCT/CN2020/074644, mailed on Nov. 12, 2020.

(Continued)

*Primary Examiner* — Chuong T Ho
(74) *Attorney, Agent, or Firm* — PV IP PC; Wei Te Chung

(57) ABSTRACT

The disclosure provides a method for wireless channel access, through which transmitter of a latency-critical communication is allowed to access the channel as soon as possible. Service-based energy detection thresholds and service-based channel access priority class may be used in listen-before-talk (LBT) operations for the latency-critical communication. When an unlicensed band is obtained for non-latency-critical service, a subset of radio resources in the unlicensed band is reserved for the latency-critical communication to bypassing an LBT operation. The method may be used to reduce latency for ultra reliable low latency communication (URLLC) transmission.

10 Claims, 5 Drawing Sheets

(56) References Cited

U.S. PATENT DOCUMENTS

2021/0410185 A1* 12/2021 Do .................... H04W 74/0808
2022/0279577 A1*  9/2022 Zhang ................. H04W 72/23
2025/0056260 A1*  2/2025 Freda .................... H04W 24/04

FOREIGN PATENT DOCUMENTS

| CN | 109076564 A | 12/2018 |
|---|---|---|
| CN | 109905926 A | 6/2019 |
| EP | 3499780 A1 | 6/2019 |

OTHER PUBLICATIONS

Written Opinion of the International Search Authority in international application No. PCT/CN2020/074644, mailed on Nov. 12, 2020.
Samsung, "UL URLLC Transmissions", 3GPP TSG RAN WG1 #87 R1-1612545, Nov. 18, 2016(Nov. 18, 2016), the whole document.
Chinese Office Action issued in corresponding Chinese Patent Application No. 202080095582.X dated Jan. 2, 2025, pp. 1-11.
NPL1: R1-1810633 Channel access for NR unlicensed operations (Revision of R1-1808335), Sep. 29, 2018.

* cited by examiner

DEVICE AND METHOD FOR WIRELESS CHANNEL ACCESS

CROSS REFERENCE TO RELATED APPLICATIONS

The disclosure is a US national phase application based upon an International Application No. PCT/CN2020/074644, filed on Feb. 10, 2020, titled "DEVICE AND METHOD FOR WIRELESS CHANNEL ACCESS", which is incorporated by reference in the present application in its entirety.

BACKGROUND OF DISCLOSURE

1. Field of Disclosure

The present disclosure relates to the field of wireless communication in unlicensed bands, and more particularly, to channel access procedures in ultra reliable low latency communication (URLLC) services.

2. Description of Related Art

Due to scarcity of licensed spectrum compared to increasing spectrum demands, stake-holders in cellular telecommunication business begin to use unlicensed bands for cooperation with licensed band networks.

Technical Problem

When data is transmitted over an unlicensed band, transmission reliability and efficiency become an important issue. One main problem in unlicensed band communication is the unpredictable transmission opportunity in time in listen-before-talk (LBT) mechanism. A transmitter performing listen-before-talk (LBT) may suffer from data transmission backoff time before gaining access to an unlicensed channel. Furthermore, the more user equipment (UE) devices compete for access to unlicensed bands, the more likely is LBT failure. The unpredictable transmission opportunity may delay the data transmission which makes the communication in unlicensed spectrum much more challenging, especially for the low latency communication scenarios. The so-called hidden node problem and bursty interference create additional challenges.

A transmitter may need to perform energy detection to determine whether an unlicensed band has been occupied by another transmitter. Basically, energy detection is made by comparing the radio energy level in the targeting band against a pre-defined threshold. A transmitter may have to listen for a long time before accessing the unlicensed spectrum.

The disclosure proposes methods and devices to address the issue of transmission latency in unlicensed band.

SUMMARY

An object of the present disclosure is to propose a device and a method for wireless channel access.

In a first aspect of the present disclosure, a method for wireless channel access including: determining a wireless communication service to be performed through a contention-based random access operation; selecting a service-based energy detection threshold associated with the wireless communication service; and using the selected service-based energy detection threshold to perform energy detection in the contention-based random access operation to obtain an unlicensed band for the wireless communication service.

In a second aspect of the present disclosure, a method for wireless channel access including: obtaining radio resources for a non-latency-critical communication service through a successful listen-before-talk operation; reserving a subset of the radio resources for a latency-critical communication service; and performing the latency-critical communication service using the subset of the radio resources bypassing a listen-before-talk operation for the latency-critical communication service.

In a third aspect of the present disclosure, a device includes a transceiver and a processor. The processor is connected with the transceiver and configured to execute the following steps comprising: determining a wireless communication service to be performed through a contention-based random access operation; selecting a service-based energy detection threshold associated with the wireless communication service; and using the selected service-based energy detection threshold to perform energy detection in the contention-based random access operation to obtain an unlicensed band for the wireless communication service.

In a fourth aspect of the present disclosure, a device includes a transceiver and a processor. The processor is connected with the transceiver and configured to execute the following steps comprising: obtaining radio resources for a non-latency-critical communication service through a successful listen-before-talk operation; reserving a subset of the radio resources for a latency-critical communication service; and performing the latency-critical communication service using the subset of the radio resources bypassing a listen-before-talk operation for the latency-critical communication service.

The disclosed method may be implemented in a chip. The chip may include a processor, configured to call and run a computer program stored in a memory, to cause a device in which the chip is installed to execute the disclosed method.

The disclosed method may be programmed as computer executable instructions stored in non-transitory computer readable medium. The non-transitory computer readable medium, when loaded to a computer, directs a processor of the computer to execute the disclosed method.

The non-transitory computer readable medium may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory.

The disclosed method may be programmed as computer program product, that causes a computer to execute the disclosed method.

The disclosed method may be programmed as computer program, that causes a computer to execute the disclosed method.

Advantageous Effects

Regarding the existing issues of large latency of channel access procedures for URLLC service, several solutions are proposed in this disclosure.

Considering that URLLC service has strict requirements on reliability and latency, it is proposed that a higher energy detection threshold is used for LBT procedures. By this way, it is easier for transmitter to complete LBT successfully and capture the channel for URLLC transmission as soon as possible. Secondly, considering that the time for LBT procedure is closely related to the channel access priority class, it proposed that transmitter uses a dedicated channel access priority class for URLLC service to reduce the processing time of LBT. Finally, by using the reserved resource indicated by pre-emption DCI, the transmitter skip LBT procedures and transmits the URLLC data directly to save the time for LBT procedures.

BRIEF DESCRIPTION OF DRAWINGS

In order to more clearly illustrate the embodiments of the present disclosure or related art, the following FIG.s will be described in the embodiments are briefly introduced. It is obvious that the drawings are merely some embodiments of the present disclosure, a person having ordinary skill in this field can obtain other FIG.s according to these figures.

DETAILED DESCRIPTION OF EMBODIMENTS

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

The disclosure provides a method for wireless channel access, through which a transmitter is allowed to access the channel as soon as possible. As an effective way, the proposed method provides the transmitter a chance to capture the channel and reduce latency for ultra reliable low latency communication (URLLC) transmission.

In NR, three typical service are applied as follows:
Enhanced Mobile Broadband (eMBB): a data-driven service requiring high data rates across a wide coverage area.
Ultra Reliable Low Latency Communications (URLLC): a service with strict requirements on latency and reliability for mission critical communications, such as remote surgery, and autonomous vehicles.
Massive Machine Type Communications (mMTC): a service to support a very large number of devices in a small area, which may only send data sporadically, such as in Internet of Things (IoT) use cases.

Different communication services have different requirements. eMBB service focuses on capacity enhancement, and mMTC service mainly focuses on ubiquitous connection with low payload. In other words, latency is not primary concern of eMBB and mMTC service types. However, devices performing URLLC service require higher reliability and lower latency. If LBT failure happens, a transmitter has to wait for another chance to perform LBT. Continuous LBT failure may delay the URLLC transmission greatly. For URLLC service, a transmitter needs to acquire the channel as soon as possible in order to provide the chance for data transmission. Comparing to other services, URLLC service needs a higher priority to grab the channel for data transmission.

Several embodiments of the disclosed method are proposed to reduce the latency for URLLC service using service based energy detection threshold, service based channel access priority, and URLLC transmission without LBT procedure. With latency requirements for different services, an energy detection (ED) threshold for URLLC service is rearranged to fine tune a probability of successfully capturing an unlicensed wireless channel. Additionally, to minimize time cost in LBT procedures, a dedicated channel access priority class for URLLC service is provided for a transmitter to hasten the LBT procedures through priority-improved likeliness of obtaining a successful LBT. Further additionally, the transmitter may use the reserved radio resources for URLLC transmission and skip LBT mechanisms. The reserved radio resources may be indicated by downlink/uplink preemption downlink control information (DCI). The latency for URLLC service may be reduced accordingly.

Figure 1:
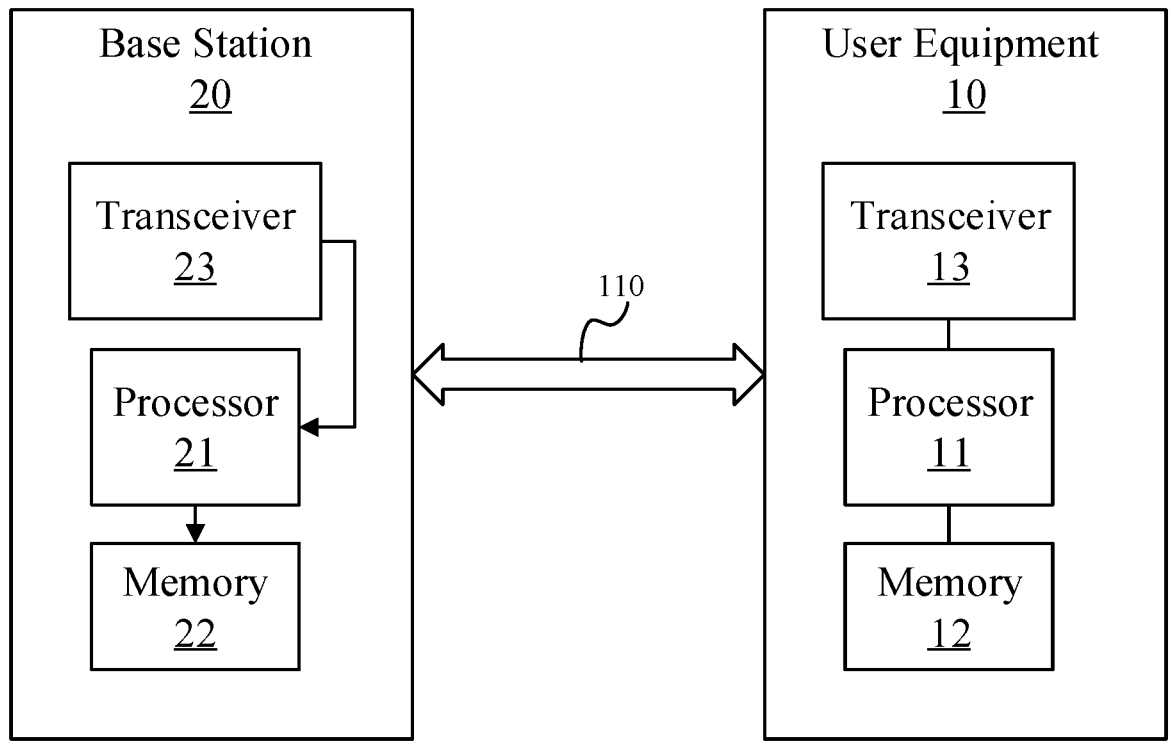
FIG. 1 is a block diagram of a user equipment (UE) and a base station (BS) according to an embodiment of the present disclosure.

FIG. 1 illustrates that, in some embodiments, a user equipment (UE) 10 and a base station (BS) 20 for executing a method for wireless channel access according to an embodiment of the present disclosure are provided. The UE 10 may include a processor 11, a memory 12, and a transceiver 13. Examples of the base station 20 may include an eNB or a gNB. The base station 20 may include a processor 21, a memory 22 and a transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21, and the transceiver 13 or 23 transmits and/or receives a radio signal through a wireless channel 110.

The processor 11 or 21 may include an application-specific integrated circuit (ASIC), other chipsets, logic circuit and/or data processing devices. The memory 12 or 22 may include a read-only memory (ROM), a random access memory (RAM), a flash memory, a memory card, a storage medium and/or other storage devices. The transceiver 13 or 23 may include baseband circuitry and radio frequency (RF) circuitry to process radio frequency signals. When the embodiments of the invention are implemented in software, the techniques described herein can be implemented with modules, such as procedures, functions, and executable programs, that perform the functions described herein. The modules can be stored in the memory 12 or 22 and executed by the processor 11 or 21. The memory 12 or 22 can be implemented within the processor 11 or 21 or external to the processor 11 or 21, in which those can be communicatively coupled to the processor 11 or 21 via an interface.

The BS 20 may connect to a network entity device serving as a node in a CN. The CN may include LTE CN or 5GC which includes user plane function (UPF), session management function (SMF), mobility management function (AMF), unified data management (UDM), policy control function (PCF), control plane (CP)/user plane (UP) separation (CUPS), authentication server (AUSF), network slice selection function (NSSF), and the network exposure function (NEF).

In some embodiments, a processor, such as the processor 11 or 21, is configured to execute a method for wireless channel access. A service based energy detection (ED) threshold is selected. The ED threshold is associated with a service type. The selected service based ED threshold is used to perform energy detection in an initial contention-based random access operation.

LBT is adopted as the fundamental coexistence mechanism for License Assisted Access (LAA), whereby a radio transmitter is required to apply a clear channel assessment (CCA) check prior to data transmission. CCA involves at least energy detection (ED) with a certain energy threshold over a time duration to determine if a channel is occupied or is clear. If the channel is occupied, random back-off applies within a contention window, so that a duration of time is introduced before the transmitter can access the channel and transmit through the channel. To protect wireless local area network (WLAN) acknowledgement (ACK) transmissions, a defer period, such as 43 micro second (μs) for best effort traffic, is applied after each busy CCA slot before resuming back-off. After the transmitter has gained access to the channel, the transmitter is only allowed to transmit for a limited duration referred to as the maximum channel occupancy time (MCOT). To provide differentiated channel access priorities based on traffic service types, such as voice over Internet protocol (VoIP), video, best effort, or background, four LBT priority classes are defined with different contention window sizes (CWS) and MCOT. Table 1 and table 2 summarize the MCOT and CWS for the four priority classes for DL and UL, respectively.

TABLE 1

Channel Access Priority Class for DL

| Channel Access Priority Class (p) | $m_p$ | $CW_{min,p}$ | $CW_{max,p}$ | $T_{m\_cot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

TABLE 2

Channel Access Priority Class for UL

| Channel Access Priority Class (p) | $m_p$ | $CW_{min,p}$ | $CW_{max,p}$ | $T_{ulm\_cot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

NOTE1:
For p = 3, 4, $T_{ulm\_cot,p}$ = 10 ms if the higher layer parameter 'absenceOfAnyOtherTechnologyr14' indicates TRUE, otherwise, $T_{ulm\_cot,p}$ = 6 ms.
NOTE 2:
When $T_{ulm\_cot,p}$ = 6 ms it may be increased to 8 ms by inserting one or more gaps. The minimum duration of a gap shall be 100 μs. The maximum duration before including any such gap shall be 6 ms.

In Table 1 and Table, 2, ms represents mini second, subscription p in the parameters $m_p$, $CW_{min,p}$, $CW_{max,p}$, $T_{ulm\_cot,p}$, and $CW_p$ represents a channel access priority class (CAPC) associated with the parameters. Parameter $m_p$ represents number of consecutive slot durations, where each slot duration is $T_{sl}$=9 μs.

Parameter $CW_p$ represents a contention window associated with a given priority class p. Parameter $CW_{max,p}$ represents a maximum contention window associated with a given priority class p. Parameter $CW_{min,p}$ represents a minimum contention window associated with a given priority class p. Parameter $T_{m\_cot,p}$ represents a maximum channel occupancy time associated with a given priority class p. Parameter $T_{ulm\_cot,p}$ represents maximum uplink channel occupancy time for a given priority class p. Definition of the parameters $m_p$, $CW_{min,p}$, $CW_{max,p}$, $T_{ulm\_cot,p}$, and $CW_p$ can be found in 3GPP TS 37.213 V15.2.0.

URLLC services with typically small data packets require an extremely high reliability, that is, layer one (L1) block error rate (BLER)≤$10^{-5}$ or $10^{-6}$ in a very short latency, that is 0.5-1 ms. URLLC is to be used for factory control, transport automation, power distribution, and other high reliable and low latency applications.

Embodiments of using service-based energy detection thresholds are detailed in the following.

A current LBT procedure uses a unified pre-defined threshold irrespective of actually wireless communication service. That is, a same ED threshold may be used to perform LBT procedures for different services. URLLC transmission using an inappropriate ED threshold may lead to continuous attempts which may delay the URLLC transmission greatly. The disclosed method provides different energy detection (ED) thresholds for different services with different latency requirements. Specifically, the ED threshold used for URLLC service is higher to grab the channel for data transmission as soon as possible.

Figure 2:
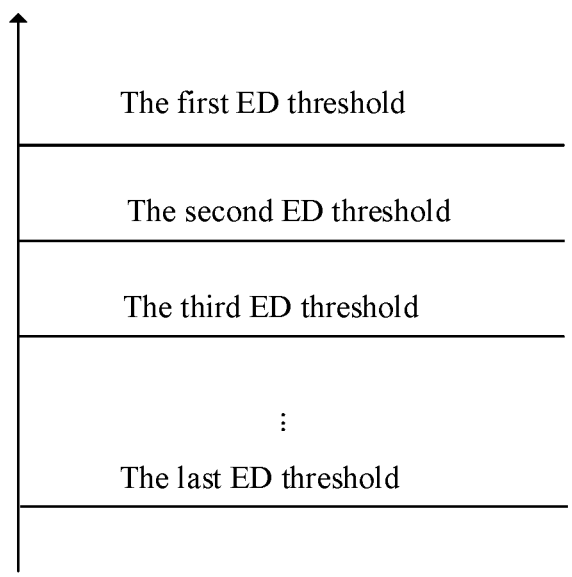
FIG. 2 is a schematic diagram showing a series of energy detection (ED) thresholds.

As shown in FIG. 2, for example, different ED thresholds is associated with different services. A series of ED thresholds can be configured by network, and different ED thresholds are associated with different services.

Figure 3:
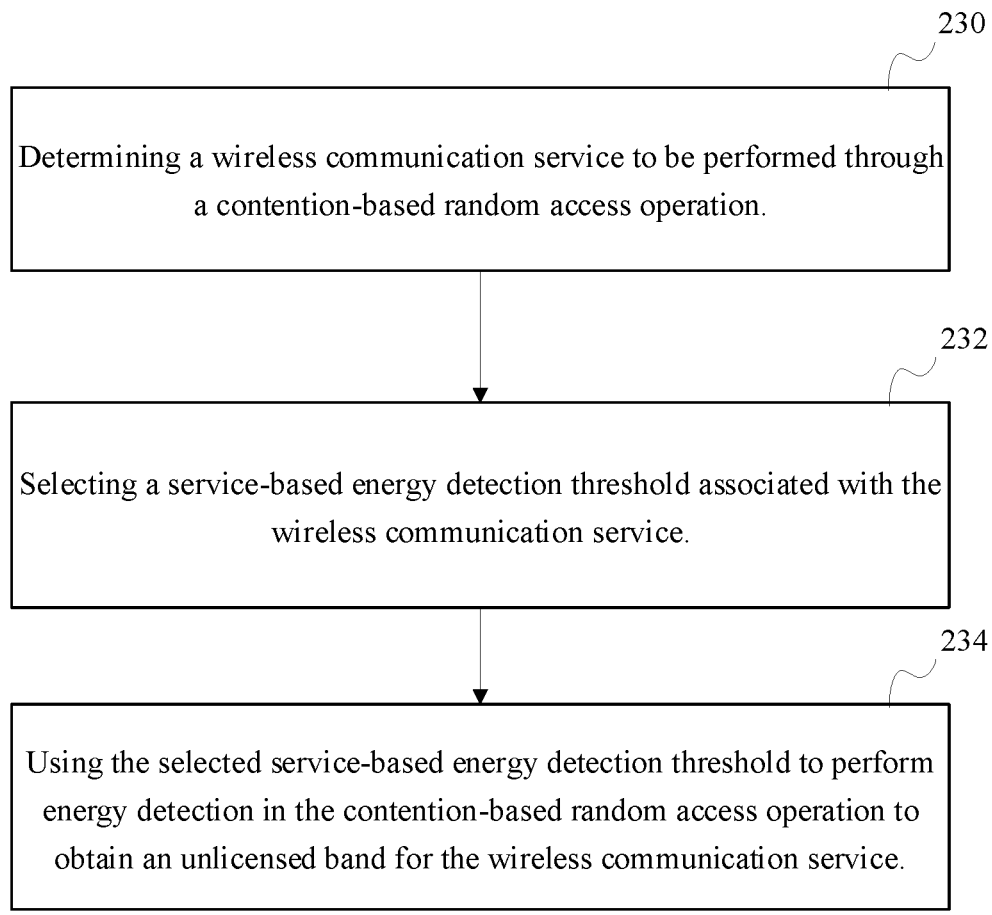
FIG. 3 is a flowchart showing a method for wireless channel access according to an embodiment of the present disclosure.

With reference to FIG. 3, a transmitter, such as the UE 10 or the BS 20, determines a wireless communication service to be performed through a contention-based random access operation (block 230). The contention-based random access operation may be a listen-before-talk operation used to access an unlicensed band, such as a new radio (NR) unlicensed band. The service-based energy detection threshold may be explicitly indicated by RRC signaling or determined by the transmitter. The transmitter selects a service-based energy detection threshold associated with the wireless communication service (block 232). The transmitter uses the selected service-based energy detection threshold to perform energy detection in the contention-based random access operation to obtain an unlicensed band for the wireless communication service (block 234).

Figure 4:
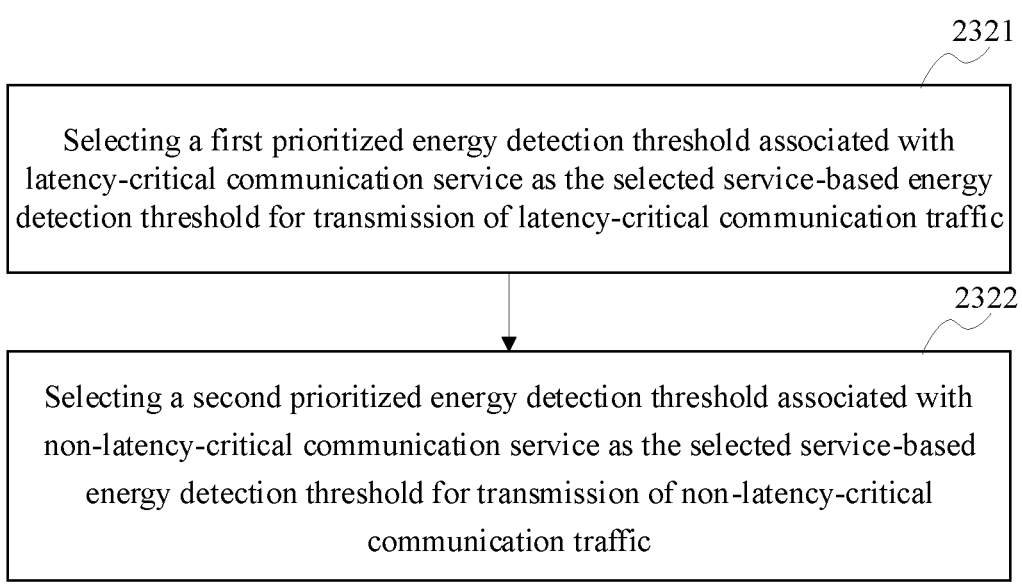
FIG. 4 is a flowchart showing service-based ED threshold assignment according to an embodiment of the present disclosure.

With reference to FIG. 4, in block 232, the transmitter selects a first prioritized energy detection threshold associated with latency-critical communication service as the selected service-based energy detection threshold for transmission of latency-critical communication traffic (block 2321). In block 232, the transmitter further selects a second prioritized energy detection threshold associated with non-latency-critical communication service as the selected service-based energy detection threshold for transmission of non-latency-critical communication traffic (block 2322).

If a higher ED threshold, such as the first ED threshold, is provided for URLLC service, a transmitter, such as the UE 10 or the BS 20, detects energy in an unlicensed wireless channel, compares detected energy to the ED threshold within a sensing slot duration, and may have higher probability to succeed in the ED. That is, the transmitter may perform fewer EDs and LBT attempts before accessing to the channel, and thus latency is reduced.

Comparing to a unified pre-defined threshold for all the services, two embodiments of the method provide service based ED thresholds to accommodate different scenarios. Any combinations of these two methods may contribute to alternative embodiments.

RRC configuration for service-based energy detection thresholds is detailed in the following.

M configurable ED thresholds are configured by radio resource control (RRC) signaling, where M is an integer and may be 1, 2, 3 or more. Among the M ED thresholds, URLLC service is associated with the highest ED threshold. For example, if M is equal to 3, these three ED thresholds are associated with three types of service, that is, URLLC, mMTC, eMBB. In the example, the first ED threshold is associated with URLLC service, the second ED threshold is associated with mMTC service, and the third ED threshold is associated with eMBB service. In another example, if M is equal to 2, the higher ED threshold is associated with URLLC service, which is a latency-critical service, and the lower ED threshold is associated with eMBB and mMTC services, which are non-latency-critical services. To save power consumption, the transmitter may directly use the associated ED thresholds for ED procedure, which are obtained through pre-configuration rather than calculation.

Embodiments of transmitter selected ED threshold is detailed in the following.

The disclosure provides two types of LBT mechanisms, including LBT initiated by a UE and LBT initiated by a BS. When one of the UE 10 and the BS 20 serve as a transmitter in the disclosed method, the other one in the UE 10 and the BS 20 may serve as a receiver in the method. A series of service based ED thresholds may be determined by the transmitter.

The transmitter may set M actual ED thresholds to be less than or equal to the maximum ED threshold which is determined by configurations, including high layer parameters, BS output power, and/or allocated bandwidth. Among the M ED thresholds, URLLC service is associated with the highest ED threshold. For example, if M is equal to 3, these three ED thresholds is associated with three types of services, including URLLC, mMTC, and eMBB. In the example, the first ED threshold is associated with URLLC service, and the other two ED thresholds are associated with mMTC and eMBB services respectively. In another example, if M is equal to 2, the higher ED threshold is associated with URLLC service, which is a latency-critical service, and the lower ED threshold is associated with eMBB and mMTC services, which are non-latency-critical services.

Embodiments of service based channel access priority assignment are detailed in the following.

Figure 5:
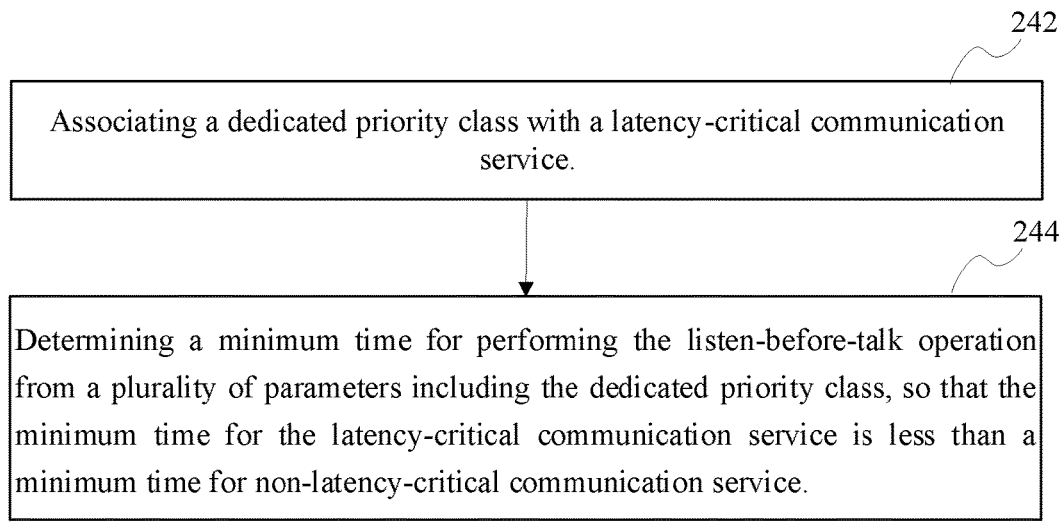
FIG. 5 is a flowchart showing generation of service-based minimum listen-before-talk operation time according to an embodiment of the present disclosure.

With reference to FIG. 5, in addition to Table 1 and Table 2, the transmitter associates a dedicated priority class with a latency-critical communication service (block 242). The transmitter determines a minimum time for performing the listen-before-talk operation from a plurality of parameters including the dedicated priority class, so that the minimum time for the latency-critical communication service is less than a minimum time for non-latency-critical communication service (block 244).

For type 1 channel access procedures, if all additional sensing slot durations are idle, the minimum time $T_{LBTmin}$ for performing LBT may be described as:

$$T_{LBTmin} = T_d + N \cdot T_{sl}$$

$$= T_f + m_p \cdot T_{sl} + N \cdot T_{sl}$$

$$= T_f + (m_p + N) \cdot T_{sl} \quad (1)$$

$T_d$ is a defer duration defined in TS 37.213. The duration $T_f$ may be equal to 16 μs or set to another value in an alternative embodiment. Sensing slot duration $T_{sl}$ is equal to 9 μs or set to another value in an alternative embodiment. The $m_p$ is the number of consecutive sensing slots according to the corresponding channel access priority class p as shown in Table 1 and Table 2. The counter N is used for counting slots for sensing channel energy and may be a random number uniformly distributed from zero up to an associated contention window.

According to the formula (1), the minimum time $T_{LBTmin}$ for LBT operations is related to channel access priority class (CAPC) in Table 1 and Table 2. Specifically, more time is required for the transmitter to perform LBT procedures if using a higher CAPC. As transmission can only be executed upon a successful LBT, the transmitter may use a dedicated CAPC to reduce latency for URLLC service. To complete an LBT procedure as soon as possible, the method uses different CAPCs for different services. Specifically, the disclosed method provides a dedicated CAPC for URLLC service. A lower priority number, such as a lower CAPC, may be used for a latency-critical communication service, and a higher priority number, such as a higher CAPC, may be used for a non-latency-critical communication service. The latency-critical communication service may include URLLC service, and non-latency-critical communication services may include eMBB service and mMTC service.

The eMBB service mainly focuses on transmitting massive payload and a dedicated CAPC with a longer channel occupancy time is preferred. For example, a higher CAPC in the Table 1 and Table 2 may be used for eMBB service. As high reliability and low latency are the primary requirements in URLLC service, a dedicated CAPC with a shorter minimum time $T_{LBTmin}$ for LBT procedure is used for URLLC service. As a result, the transmitter may complete the LBT procedure with a successful LBT within a reduced latency and have a higher priority for channel access.

To differentiate CAPC for more service types, a domain of the CAPC comprises more than four CAPCs. For example, the Table 1 and Table 2 may be extended to include greater integer value CAPCs up to 8 or 16. Furthermore, a set of parameters $m_p$, $CW_{min,p}$, $CW_{max,p}$, and $T_{m\ cot,p}$ associated with a CAPC may be also updated to reasonable values to form new tables entries for associating the updated parameters with the extended CAPC for DL and UL. In the new table entries, URLLC service uses a subset of lower CAPC, such as p=1, 2, or 3, with the associated parameters $m_p$, $CW_{min,p}$, $CW_{max,p}$, and $T_{m\ cot,p}$ while non-latency-critical services use a subset of higher CAPCs, such as p=14, 15, or 16, with the associated parameters including $m_p$, $CW_{min,p}$, $CW_{max,p}$, and $T_{m\ cot,p}$.

Embodiments of downlink URLLC transmission without LBT procedure are detailed in the following.

Radio resources defined by a particular subset of physical resource blocks (PRBs) and a group of orthogonal frequency division modulation (OFDM) symbols in DL channel may initially not intended for data transmission to the UE 10. The UE 10 may be provided with DL preemption indication carried in scheduling DCI, such as DCI 2_1, or RRC signaling, which indicates that the particular subset of PRBs and OFDM symbol group in the DL channel can be pre-empted by the UE 10 for URLLC transmission. One or more time-frequency resource sets signaled by high layer parameters determines how the UE interprets the DL preemption DCI payload. Then the resulting subset of PRBs and OFDM symbol group are determined based on the preemption DCI.

Figure 6:
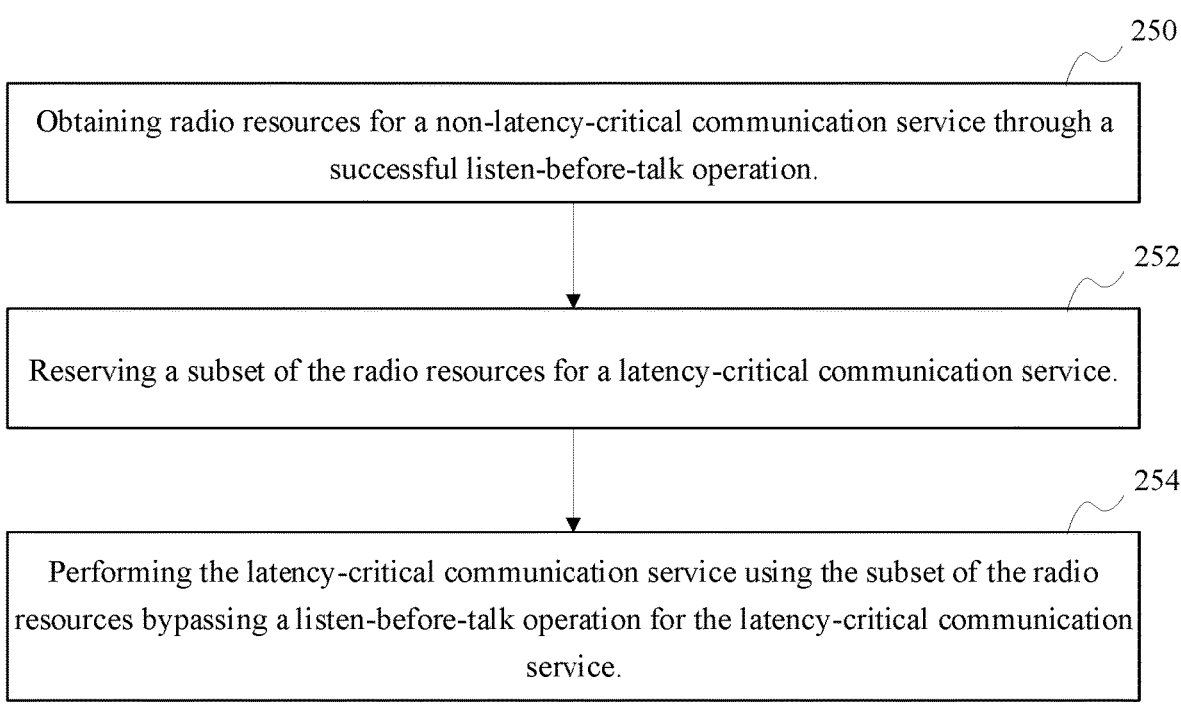
FIG. 6 is a flowchart showing latency-critical service bypassing listen-before-talk operation according to an embodiment of the present disclosure.

With reference to FIG. 6, the transmitter obtains radio resources for a non-latency-critical communication service through a successful listen-before-talk operation (block 250) and reserves a subset of the radio resources for a latency-critical communication service (block 252). The disclosed method may be applied to intra UE multiplexing for different communication services. Similarly, the disclosed method may be applied to inter UE multiplexing for different UEs with different communication services. The subset of the radio resources may be indicated in a preemption indication. The subset of the radio resources may be indicated by downlink control information (DCI) or radio resource control signaling. The latency-critical communication service includes URLLC. The non-latency-critical communication service may include one of eMBB and mMTC.

The transmitter performs the latency-critical communication service using the subset of the radio resources bypassing a listen-before-talk operation for the latency-critical communication service (block 254).

For eMBB service in unlicensed spectrum, the BS 20 may perform LBT successfully and obtain a wireless unlicensed channel for eMBB traffic. The BS 20 may reserve a subset of PRBs and symbols in the obtained channel. If URLLC traffic is ready to be transmitted, the BS 20 does not perform an LBT operation and directly transmits the URLLC traffic in the reserve resources, that is the reserved subset of PRBs and OFDM symbols, which are indicated by DL preemption DCI. The BS 20 may thus save time and reduce latency for URLLC service.

Figure 7:
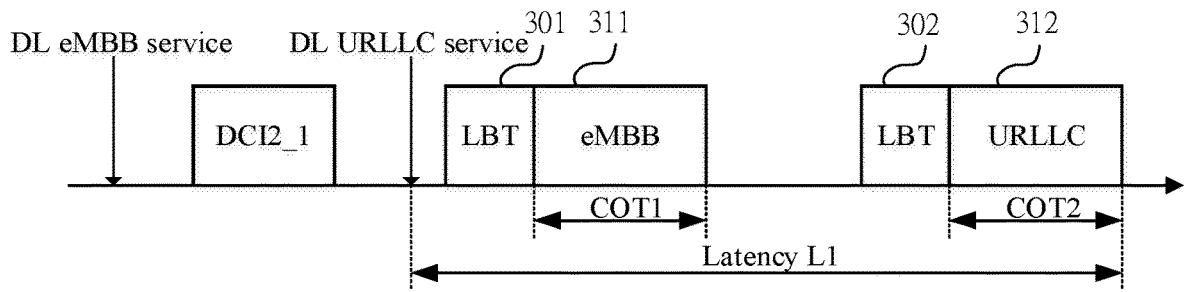
FIG. 7 is a schematic diagram showing unlicensed channel access for downlink ultra reliable low latency communication (URLLC) service.

As shown in FIG. 7, the BS 20 performs an LBT procedure 301 and obtains radio resources 311 in an unlicensed band for DL eMBB transmission. The BS 20 performs an LBT procedure 302 and obtains radio resources 312 in the unlicensed band for DL URLLC transmission. The LBT procedure 302 for URLLC begins after the end of COT1. If the LBT procedure 302 is successful, the BS 20 may complete the DL URLLC transmission in the unlicensed band during COT2 with latency L1. If the LBT fails, unpredictability of LBT even delay the DL URLLC transmission.

Figure 8:
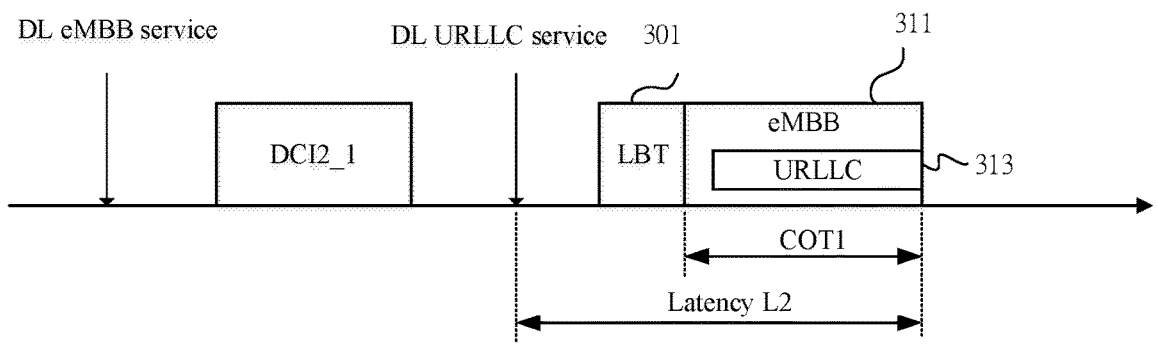
FIG. 8 is a schematic diagram showing unlicensed channel access for downlink URLLC by preempting a first non-latency-critical service according to an embodiment of the present disclosure.

As is shown in FIG. 8, the BS 20 performs an LBT procedure 301 and obtains radio resources 311 in an unlicensed band for DL eMBB transmission. The BS 20 bypasses the LBT procedure for DL URLLC traffic and obtains a subset 313 of radio resources 311 in the unlicensed band, and uses the subset of radio resources 313 for DL URLLC transmission. In FIG. 8, no LBT procedure is performed for the URLLC traffic. The BS 20 may complete the URLLC transmission in the unlicensed band during COT1 with latency L2. The URLLC traffic is transmitted in the reserved resources 313 which is indicated by DCI 2_1 to reduce the transmitting latency.

Figure 9:
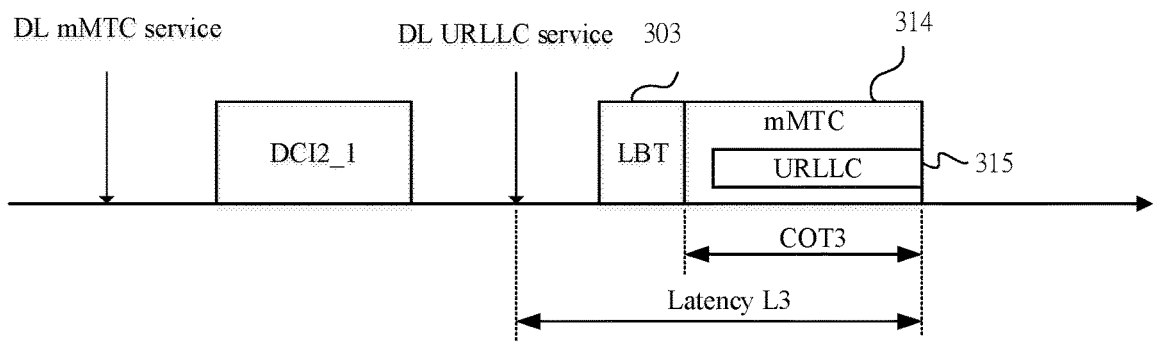
FIG. 9 is a schematic diagram showing unlicensed channel access for downlink URLLC by preempting a second non-latency-critical service according to an embodiment of the present disclosure.

In another example, if mMTC service successfully capture the channel through an LBT operation, URLLC traffic is to be transmitted in reserved resource which are indicated by DL preemption DCI by skipping an LBT procedure for URLLC traffic. As is shown in FIG. 9, the BS 20 performs an LBT procedure 303 and obtains radio resources 314 in an unlicensed band for DL mMTC transmission. The BS 20 bypasses the LBT procedure for DL URLLC traffic and obtains a subset 315 of radio resources 314 in the unlicensed band, and uses the subset of radio resources 315 for DL URLLC transmission. In FIG. 9, no LBT procedure is performed for the URLLC traffic. The BS 20 may complete the URLLC transmission in the unlicensed band during COT3 with latency L3. The URLLC traffic is transmitted in the reserved resources 315 which is indicated by DCI 2_1 to reduce the transmitting latency.

Embodiments of uplink URLLC transmission without LBT procedure are detailed in the following.

For UL transmission in unlicensed band, if the UE 10 performs LBT successfully and acquires the channel for non-latency-critical transmission, the UE 10 may skip the LBT procedure for UL URLLC transmission and directly transmit the UL URLLC traffic using the reserved resources which is indicated by UL preemption DCI. This proposed method reduces latency by skipping LBT procedures for UL URLLC transmission. The disclosed method is beneficial especially when success LBT is unpredictable.

Figure 10:
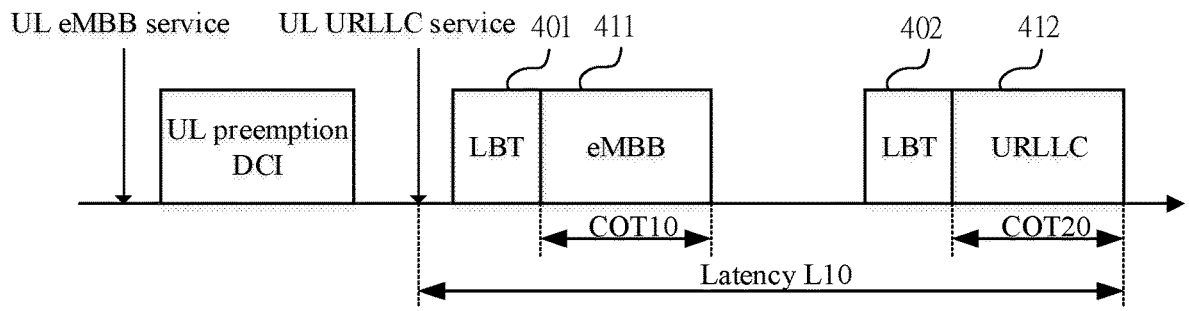
FIG. 10 is a schematic diagram showing unlicensed channel access for uplink URLLC service.

As shown in FIG. 10, the UE 10 performs an LBT procedure 401 and obtains radio resources 411 in an unlicensed band for UL eMBB transmission. The UE 10 performs an LBT procedure 402 and obtains radio resources 412 in the unlicensed band for UL URLLC transmission. The LBT procedure 402 for URLLC begins after the end of COT10. If the LBT procedure 402 is successful, the UE 10 may complete the UL URLLC transmission in the unlicensed band during COT20 with latency L10. If the LBT fails, unpredictability of LBT even delay the UL URLLC transmission.

Figure 11:
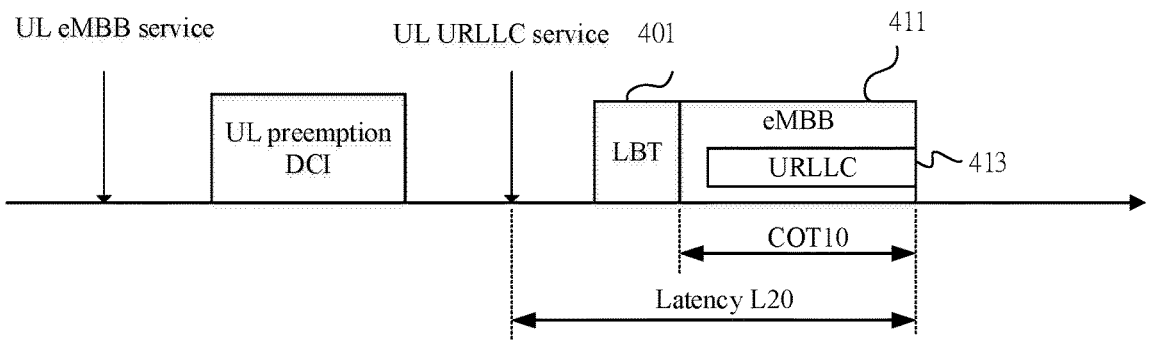
FIG. 11 is a schematic diagram showing unlicensed channel access for uplink URLLC by preempting a first non-latency-critical service according to an embodiment of the present disclosure.

As is shown in FIG. 11, the UE 10 performs an LBT procedure 401 and obtains radio resources 411 in an unlicensed band for UL eMBB transmission. The UE 10 bypasses the LBT procedure for UL URLLC traffic and obtains a subset 413 of radio resources 411 in the unlicensed band, and uses the subset of radio resources 413 for UL URLLC transmission. In FIG. 11, no LBT procedure is performed for the URLLC traffic. The UE 10 may complete the URLLC transmission in the unlicensed band during COT10 with latency L20. The URLLC traffic is transmitted in the reserved resources 413 which is indicated by UL preemption DCI to reduce the transmitting latency.

Figure 12:
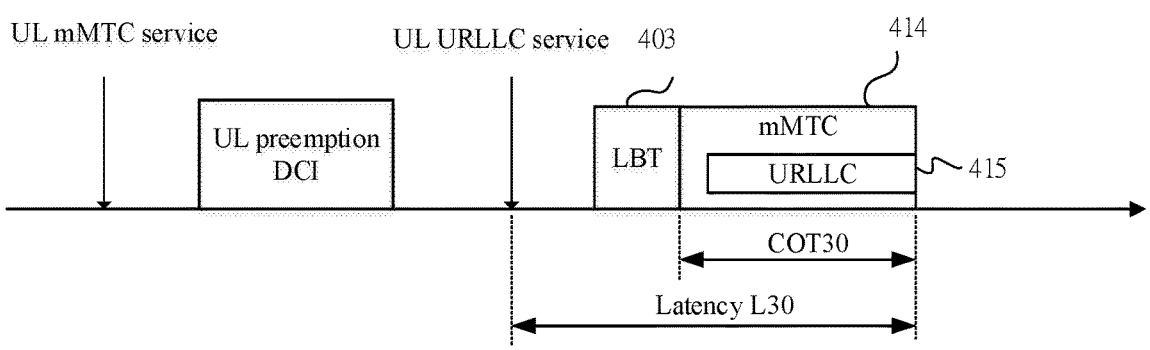
FIG. 12 is a schematic diagram showing unlicensed channel access for uplink URLLC by preempting a second non-latency-critical service according to an embodiment of the present disclosure.

In another example, if mMTC service successfully capture the channel through an LBT operation, URLLC traffic is to be transmitted in reserved resource which are indicated by UL preemption DCI by skipping an LBT procedure for URLLC traffic. As is shown in FIG. 12, the UE 10 performs an LBT procedure 403 and obtains radio resources 414 in an unlicensed band for UL mMTC transmission. The UE 10 bypasses the LBT procedure for UL URLLC traffic and obtains a subset 415 of radio resources 414 in the unlicensed band, and uses the subset of radio resources 415 for UL URLLC transmission. In FIG. 12, no LBT procedure is performed for the URLLC traffic. The UE 10 may complete the URLLC transmission in the unlicensed band during COT30 with latency L30. The URLLC traffic is transmitted in the reserved resources 415 which is indicated by UL preemption DCI to reduce the transmitting latency.

Figure 13:
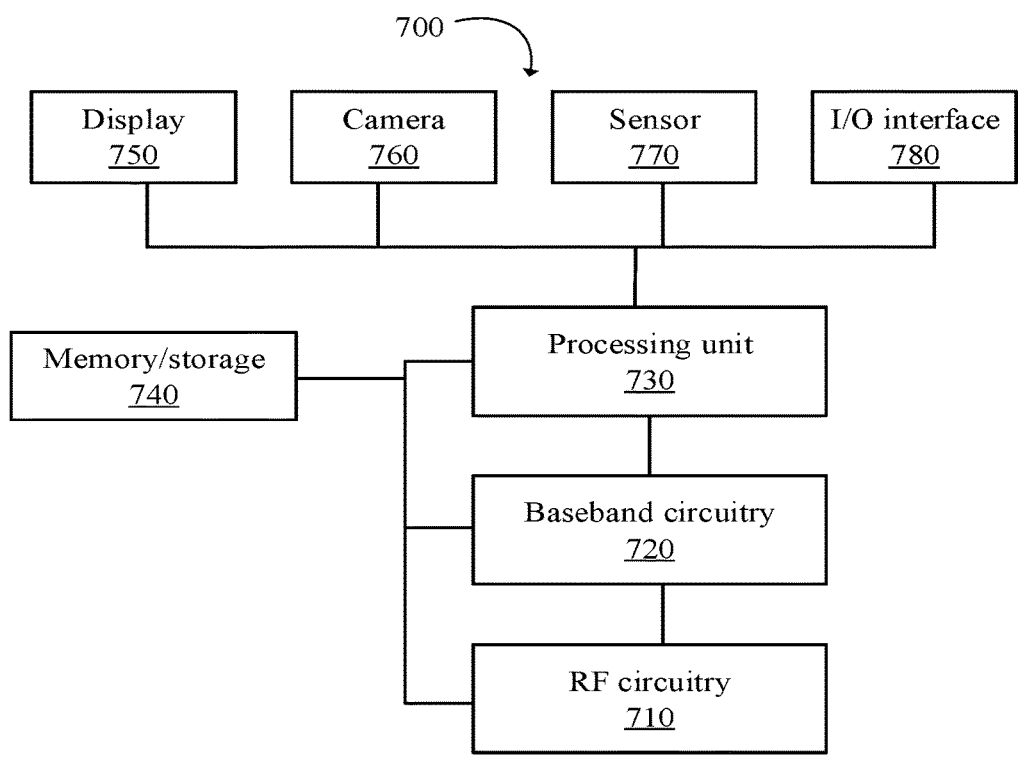
FIG. 13 is a block diagram of a system for wireless communication according to an embodiment of the present disclosure.

FIG. 13 is a block diagram of an example system 700 for wireless communication according to an embodiment of the present disclosure. Embodiments described herein may be implemented into the system using any suitably configured hardware and/or software. FIG. 13 illustrates the system 700 including a radio frequency (RF) circuitry 710, a baseband circuitry 720, a processing unit 730, a memory/storage 740, a display 750, a camera 760, a sensor 770, and an input/output (I/O) interface 780, coupled with each other as illustrated.

The processing unit 730 may include a circuitry, such as, but not limited to, one or more single-core or multi-core processors. The processors may include any combinations of general-purpose processors and dedicated processors, such as graphics processors and application processors. The processors may be coupled with the memory/storage and configured to execute instructions stored in the memory/storage to enable various applications and/or operating systems running on the system.

The baseband circuitry 720 may include a circuitry, such as, but not limited to, one or more single-core or multi-core processors. The processors may include a baseband processor. The baseband circuitry may handle various radio control functions that enable communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with 5G NR, LTE, an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry. In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency.

The RF circuitry 710 may enable communication with wireless networks using modulated electromagnetic radiation through a non-solid medium. In various embodiments, the RF circuitry may include switches, filters, amplifiers, etc. to facilitate the communication with the wireless network. In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the UE, eNB, or gNB may be embodied in whole or in part in one or more of the RF circuitries, the baseband circuitry, and/or the processing unit. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules. In some embodiments, some or all of the constituent components of the baseband circuitry, the processing unit, and/or the memory/storage may be implemented together on a system on a chip (SOC).

The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory. In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite. In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, etc. In various embodiments, system may have more or less components, and/or different architectures. Where appropriate, methods described herein may be implemented as a computer program. The computer program may be stored on a storage medium, such as a non-transitory storage medium.

The embodiment of the present disclosure is a combination of techniques/processes that can be adopted in 3GPP specification to create an end product.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

The disclosed method provides flexible QoS management based on sidelink traffic types. Sidelink transmission of each traffic type may have configurable priority to meet different communication cases and QoS requirements according to the disclosure.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claim.

What is claimed is:

1. A method for wireless channel access, executable by a device, comprising:
   determining a wireless communication service to be performed through a contention-based random access operation;
   selecting a service-based energy detection threshold associated with the wireless communication service; and
   using the selected service-based energy detection threshold to perform energy detection in the contention-based random access operation to obtain an unlicensed band for the wireless communication service;
   wherein the contention-based random access operation is a listen-before-talk operation;
   wherein the selecting further comprises:
   selecting a first prioritized energy detection threshold associated with latency-critical communication service as the selected service-based energy detection threshold for transmission of latency-critical communication traffic; and
   selecting a second prioritized energy detection threshold associated with non-latency-critical communication service as the selected service-based energy detection threshold for transmission of non-latency-critical communication traffic;
   further comprising:
   associating a dedicated priority class with a latency-critical communication service;
   wherein the dedicated priority class comprises a channel access priority class (CAPC);
   further comprising:
   determining a minimum time $T_{LBTmin}$ for performing the listen-before-talk operation;
   wherein the minimum time $T_{LBTmin}$ for performing the listen-before-talk operation is derived from a plurality of parameters including the CAPC.

2. The method of claim 1, wherein the listen-before-talk operation is used to access a new radio unlicensed band.

3. The method of claim 1, wherein minimum time $T_{LBTmin}$ for performing the listen-before-talk operation is derived according to the formula:

$$T_{LBTmin} = T_f + (m_p + N) \cdot T_{sl}$$

wherein $T_f$ is a constant duration, $T_{sl}$ is a sensing slot duration, the $m_p$ is a number of consecutive sensing slots according to the CAPC, and N is a counter for counting slots for sensing channel energy.

4. The method of claim 3, wherein a domain of the CAPC comprises more than four CAPCs.

5. The method of claim 1, wherein the latency-critical communication service comprises ultra reliable low latency communication (URLLC).

6. The method of claim 5, wherein the service-based energy detection threshold is selected by the device serving as a transmitter.

7. The method of claim 5, wherein the service-based energy detection threshold is explicitly indicated by radio resource control (RRC) signaling.

8. A device, comprising:
a transceiver; and
a processor connected with the transceiver and configured to execute the following steps comprising:
determining a wireless communication service to be performed through a contention-based random access operation;
selecting a service-based energy detection threshold associated with the wireless communication service; and
using the selected service-based energy detection threshold to perform energy detection in the contention-based random access operation to obtain an unlicensed band for the wireless communication service;
wherein the contention-based random access operation is a listen-before-talk operation;
wherein the selecting further comprises:
selecting a first prioritized energy detection threshold associated with latency-critical communication service as the selected service-based energy detection threshold for transmission of latency-critical communication traffic; and
selecting a second prioritized energy detection threshold associated with non-latency-critical communication service as the selected service-based energy detection threshold for transmission of non-latency-critical communication traffic;
wherein the processor is further configured to execute the step of:
associating a dedicated priority class with a latency-critical communication service;
wherein the dedicated priority class comprises a channel access priority class (CAPC);
wherein the processor is further configured to execute the step of:
determining a minimum time $T_{LBTmin}$ for performing the listen-before-talk operation;
wherein the minimum time $T_{LBTmin}$ for performing the listen-before-talk operation is derived from a plurality of parameters including the CAPC.

9. The device of claim 8, wherein the listen-before-talk operation is used to access a new radio unlicensed band.

10. A chip, comprising:
a processor, configured to call and run a computer program stored in a memory, to cause a device in which the chip is installed to execute the method of claim 1.

* * * * *